(12) United States Patent
Werner et al.

(10) Patent No.: US 10,710,399 B2
(45) Date of Patent: *Jul. 14, 2020

(54) VEHICLE WHEEL HAVING A CONNECTION BETWEEN A WHEEL RIM AND A WHEEL DISC AND METHOD FOR THE PRODUCTION THEREOF

(71) Applicant: THYSSENKRUPP CARBON COMPONENTS GMBH, Wilsdruff STT Kesselsdorf (DE)

(72) Inventors: Jens Werner, Coswig (DE); Christian Koehler, Dresden (DE); Sandro Maeke, Dohma (DE); Michael Dressler, Dresden (DE); Christian Heilmann, Dresden (DE); Florian Franke, Dresden (DE)

(73) Assignee: THYSSENKRUPP CARBON COMPONENTS GMBH, Wilsdruff STT Kesselsdorf (DE)

(*) Notice: Subject to any disclaimer, the term of this patent is extended or adjusted under 35 U.S.C. 154(b) by 412 days.

This patent is subject to a terminal disclaimer.

(21) Appl. No.: 15/520,238

(22) PCT Filed: Oct. 27, 2015

(86) PCT No.: PCT/DE2015/100452
§ 371 (c)(1),
(2) Date: Apr. 19, 2017

(87) PCT Pub. No.: WO2016/066161
PCT Pub. Date: May 6, 2016

(65) Prior Publication Data
US 2017/0313126 A1  Nov. 2, 2017

(30) Foreign Application Priority Data

Oct. 27, 2014 (DE) .................. 10 2014 115 591
Oct. 27, 2014 (DE) .................. 10 2014 115 593

(51) Int. Cl.
*B60B 3/04* (2006.01)
*B60B 23/08* (2006.01)

(52) U.S. Cl.
CPC .............. *B60B 3/041* (2013.01); *B60B 23/08* (2013.01); *B60B 2310/228* (2013.01);
(Continued)

(58) Field of Classification Search
CPC .. B60B 3/00; B60B 3/04; B60B 3/041; B60B 3/042; B60B 3/12; B60B 23/08
See application file for complete search history.

(56) References Cited

U.S. PATENT DOCUMENTS

| 1,802,773 A | 4/1931 | Nelson |
| 1,971,604 A | 8/1934 | Frank |

(Continued)

FOREIGN PATENT DOCUMENTS

| EP | 1858715 B1 | 11/2009 |
| FR | 2471291 A | 6/1981 |

(Continued)

*Primary Examiner* — Jason R Bellinger
(74) *Attorney, Agent, or Firm* — thyssenkrupp North America, LLC

(57) ABSTRACT

Disclosed is a vehicle wheel having a wheel rim and a wheel disc connected to an inner side of the wheel rim. The wheel disc is connected to the wheel rim by a connecting element which is guided through a through-hole of the rim base and inserted in the wheel disc. The through-hole is arranged in the tire seat of the rim base and the connecting element is joined substantially in the direction of the radial extension of the wheel disc which is associated to the tire seat on the inner side of the rim. In the method for producing the wheel the connection between wheel rim and wheel disc is produced in the region of the tire seat of the rim base, and, after the insertion of the connecting element into the wheel disc, a portion of the connecting element protruding the contour of
(Continued)

Figure 1:
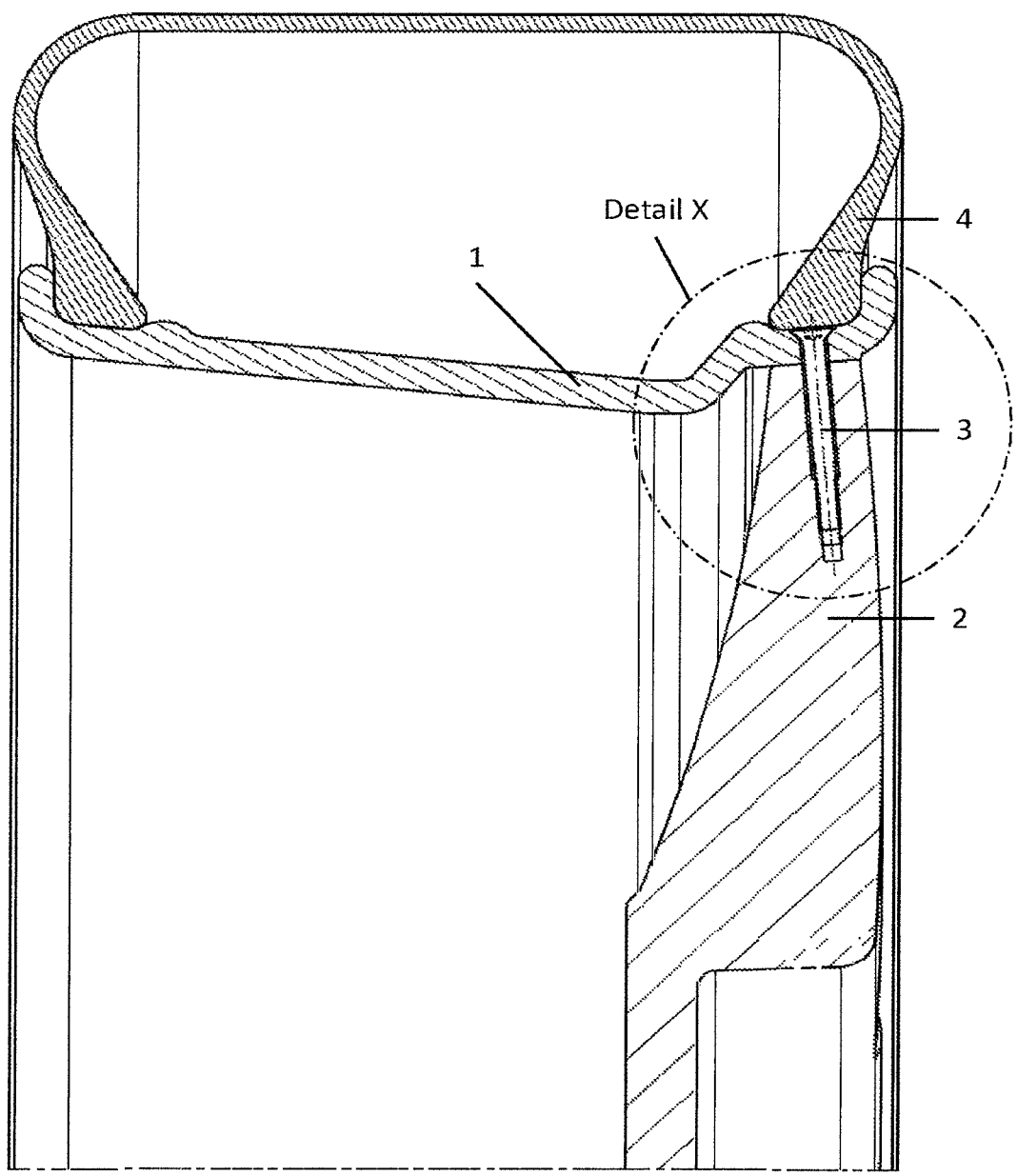

Detail X the outer side of the rim of the tire seat is shaped so that the connecting element conforms to the contour of the outer side of the rim of the tire seat.

6 Claims, 6 Drawing Sheets

(52) U.S. Cl.
CPC ... *B60B 2310/231* (2013.01); *B60B 2310/232* (2013.01); *B60B 2310/30* (2013.01); *B60B 2310/305* (2013.01); *B60B 2310/616* (2013.01); *B60B 2900/212* (2013.01); *B60B 2900/311* (2013.01)

(56) References Cited

U.S. PATENT DOCUMENTS

| | | | | |
|---|---|---|---|---|
| 2,007,892 A * | 7/1935 | Farr | ............... | B21D 53/268 219/91.2 |
| 2,805,894 A | 9/1957 | Gilbert | | |
| 3,346,301 A * | 10/1967 | Hurst, Jr. | ............... | B60B 1/08 29/525.06 |
| 3,549,205 A * | 12/1970 | Reid | ............... | B60B 1/08 301/63.107 |
| 4,153,267 A * | 5/1979 | Hilber | ............... | B60B 1/08 280/281.1 |
| 4,431,353 A | 2/1984 | Capuano | | |
| 4,877,249 A | 10/1989 | Thompson | | |
| 4,898,429 A * | 2/1990 | Plumer | ............... | B60B 3/145 301/35.632 |
| 5,997,102 A * | 12/1999 | Stanavich | ............... | B60B 3/005 29/894.322 |
| 6,045,196 A * | 4/2000 | Mason | ............... | B60B 3/005 29/894.322 |
| 6,629,736 B2 * | 10/2003 | Coleman | ............... | B21D 53/26 301/63.102 |
| 7,900,412 B2 * | 3/2011 | West | ............... | B64D 37/06 52/394 |
| 8,869,579 B2 * | 10/2014 | Bray | ............... | F16B 19/008 411/82.3 |
| 2004/0021365 A1 | 2/2004 | Georgeff | | |
| 2004/0227392 A1 | 11/2004 | Coleman | | |
| 2006/0141242 A1 * | 6/2006 | Keener | ............... | B05D 7/16 428/334 |
| 2008/0048489 A1 * | 2/2008 | Liu | ............... | B60B 1/041 301/61 |
| 2008/0143171 A1 | 6/2008 | Wilson | | |
| 2010/0117443 A1 * | 5/2010 | Luo | ............... | B23K 20/122 301/63.102 |
| 2012/0168055 A1 * | 7/2012 | Bray | ............... | F16B 1/0071 156/64 |
| 2012/0235467 A1 * | 9/2012 | Tho | ............... | B60B 21/062 301/95.11 |
| 2016/0325582 A1 * | 11/2016 | Werner | ............... | B60B 3/041 |
| 2017/0314604 A1 * | 11/2017 | Werner | ............... | B60B 3/041 |

FOREIGN PATENT DOCUMENTS

| | | |
|---|---|---|
| GB | 189152 A | 3/1923 |
| GB | 195684 A | 4/1923 |
| GB | 684821 A | 12/1952 |
| WO | 2010067383 A1 | 6/2010 |

* cited by examiner

Detail X

VEHICLE WHEEL HAVING A CONNECTION BETWEEN A WHEEL RIM AND A WHEEL DISC AND METHOD FOR THE PRODUCTION THEREOF

CROSS-REFERENCE TO RELATED APPLICATIONS

This application is a U.S. National Stage Entry of International Patent Application No. PCT/DE2015/100452, filed Oct. 27, 2015, which claims priority to German Patent Application Nos. DE102014115593.9 and DE102014115591.2, which were filed Oct. 27, 2014, the entire contents of all of which are incorporated herein by reference.

BACKGROUND OF THE INVENTION

1. Field of the Invention

The invention relates to a vehicle wheel with a wheel rim and a wheel disc connected to a rim inner side of the wheel rim, whereby the wheel disc is connected to the wheel rim by means of at least one connecting element which is guided through a through-hole of the rim base and inserted in the wheel disc.

The invention also relates to a method for the production of the vehicle wheel with such a connection between the wheel rim and the wheel disc of the vehicle wheel.

The vehicle wheel is used for all types of motorised vehicles, in particular as a lightweight-construction vehicle wheel for passenger cars and motorcycles.

The wheel disc can be designed as a wheel spider with spokes (spoke wheel) or as a largely closed-surface wheel disc.

2. Discussion of Background Information

A device of this type is known from printed publication US 2004/0021365 A1. With this vehicle wheel, a star-shaped wheel disc (wheel spider, spoke unit) is connected to the wheel rim by means of blind rivets or several (stud) bolts. The connecting elements lead from the rim outer side of the wheel rim through—in each case—one through-hole in the well of the rim base and are riveted or screwed to the adjacent spoke unit on the inner side of the rim. The wheel disc is supported on the rim inner side of the wheel rim against the well of the rim base.

A device of this type is also known from printed publication EP 1 858 715 B1. With this vehicle wheel, a star-shaped wheel disc (wheel spider) is connected to the wheel rim by means of several connecting elements which may be screws or rivets and which each lead through one through-hole in the rim base. The connecting elements are screwed or riveted from the rim outer side of the wheel rim into the wheel spider.

The connections are formed in the well of the rim base or in the transition zone from the well to the rim shoulder (hump) of the rim base, whereby the wheel disc on the rim inner side of the wheel rim is connected to the rim base in the area of the well or in the transition zone from the well to the hump.

The forces arising on the named wheel designs during wheel operation are transmitted from a tire sitting in the tire seat of the wheel rim via the rim base, in particular via the well of the rim base, and further via the connecting elements to the wheel disc and subsequently to the wheel hub.

The complex, constantly changing operational loads on the vehicle are generated among other things by the structural wheel load according to type of motor vehicle and payload, by the profile of the road surface, by the vehicle handling through braking and acceleration, by temperature influences and by unusual effects such as potholes and driving over a kerb and require, in order to ensure a secure wheel design, connecting elements which, for the transmission of the high forces, have an appropriate effective length or joining length and/or have an appropriate effective cross section or joining cross section.

With the known wheel designs, there is little space available in the area of the well for a radial connection of the wheel disc and for the longitudinal extension and cross sectional design of the connecting elements provided for the connection between the wheel rim and the wheel disc.

In most cases a braking system is installed on the wheel hub in the interior of the wheel rim; the wheel disc is also arranged on this, so that this internal area of the wheel rim must be kept free for the brake. Particularly with sports cars or heavy vehicles with brakes of accordingly large dimensions, therefore, the space for the radial connection of the wheel disc to the well is limited.

If the connecting elements are arranged in the area of the diagonal transition zone from the well to the hump of the rim base, then owing to the diagonal alignment associated with this their possible longitudinal extension is limited by the axial outer side of the wheel disc or of the spokes.

With the alternative use of connecting elements with a larger cross section, correspondingly larger drilled holes or counterbores are needed in the rim base. These, however, generate a greater notching effect in the rim base, as a result of which the strength of the wheel rim is reduced.

In this case, the wheel disc or the spokes in the connection area must also be designed more solidly, which contrary to the lightweight-construction requirements placed on them results in a compactness of the wheel disc with an unfavourable mass.

In addition, through an arrangement of the connecting elements in the zone of transition from the well to the shoulder, the well must be designed according to the cross section of the connecting elements and the associated required size of the drilled holes and contact surfaces more deeply, which however, contrary to the interest in lightweight construction, increases the mass of the wheel rim.

If the possible size of the connecting elements is limited in any way, then in order to ensure the connection is secure the number of required connecting elements must be increased, which on the one hand requires greater effort and expense in terms of construction and installation, and on the other, again makes the weight assessment of the vehicle wheel worse.

SUMMARY OF THE INVENTION

The problem underlying the invention is therefore, in the interest of the lightweight construction requirements placed on the vehicle wheel, to increase the forces transmittable with the connection and at the same time to reduce the mass requirement of the connection between wheel disc and wheel rim and hence to improve the reliability and durability of the connection while keeping the mass input low.

Also incumbent on the invention is the task of providing a method for the production of such a vehicle wheel with which the problem the vehicle wheel is set is achieved with little effort and expense from design, process engineering and technological perspectives.

To solve the problem, in device terms it is provided that the through-hole is arranged in the tire seat of the rim base and the connecting element guided through the through-hole is essentially inserted in the direction of the radial extension of the wheel disc assigned to the tire seat on the inner side of the rim.

The connection of the wheel disc to the wheel rim is formed in the area of the tire seat of the rim base which extends between the rim flange and the rim shoulder (hump), whereby the essentially radially extended wheel disc, assigned to this area, is attached on the rim inner side of the wheel rim.

Through this arrangement and design, according to the invention, of the components involved in the connection, an installation space is made available for the connection which enables an increase in the transmittable forces per connecting element.

In particular, the usable installation space for the connecting element within the wheel disc radially extended up to the raised tire seat is expanded.

The radial or virtually radial alignment of the connecting element in the direction of the radial extension of the wheel disc makes it possible to use longer connecting elements with a correspondingly larger force-transmitting length to achieve a greater effective length or joining length, which improves the reliability and durability of the connection.

The connecting element can preferably be a screw, a (stud) bolt, a threaded rod or a rivet (e.g. of the HI-LOK type) and as appropriate be equipped with a countersunk head, flat head or raised head.

When using screws as a connecting element, it is thus possible to achieve greater thread lengths as a usable effective length, as a result of which the maximum possible screw force for the relevant material pairing can be applied to the connection. Through the consequent higher transmittable forces per connecting element, on the one hand the cross section of the connecting elements can have a slimmer design and, as the case may be, on the other hand the number of connecting elements needed in total for the connection of the wheel disc can be reduced.

Thanks to the slimmer design of the connecting elements and/or also thanks to the smaller number of connecting elements, the notches introduced into the material of the rim base are reduced and the strength of the wheel rim increased.

As a result, the connecting elements designed and arranged according to the invention contribute, while ensuring the security requirements placed on the connection, to the reduction in the mass of the vehicle wheel.

Over and above this, the geometry of the well can be designed more freely, since it is not dependent on the requirements of the connection with the wheel disc and in particular does not have to be adapted to the arrangement of the connecting elements, which can contribute to further mass optimisation on the wheel rim.

The arrangement according to the invention of the components involved in the connection results not least in visually attractive large wheel discs, which come up to the tire seat far towards the outside.

As a consequence of the arrangement, according to the invention, of the connection in the tire seat it is possible, as opposed to a conventional connection of the wheel disc to the well, also for the peripheral area of the wheel disc or the ends of the spokes to be designed non-thickened and thereby slimmer, by which means a reduction in the mass of the wheel disc can also be achieved.

The longitudinally extended space available according to the invention for the connection makes it possible to provide not only a longer connecting element with a greater effective length or joining length but also with a greater length of elongation. The overall length of the connecting element, which can be generously designed, permits a considerably long shaft section of the connecting element, which can be provided to form a high length of elongation.

The length of elongation describes a shaft section of the connecting element, not directly involved in the transmission of force, beyond the force-transmitting section on the shaft end, that constitutes the effective length or joining length.

Here the invention assumes that, with increasing length of elongation of the connecting element pre-stressed for the transmission of force, a greater longitudinal elongation of the connecting element can occur and thereby the influence of settling phenomena, i.e. the plastic deformation of the components and materials involved in the connection can be better compensated.

The longitudinally extended space available for the formation of the length of elongation makes it possible to, in an optimal manner, adapt this very flexibly to the settling phenomena expected with the connection in question.

This shaft section of the connecting element not directly involved in the transmission of force can preferably be a multiple of the effective length of the force-transmitting section of the connecting element.

With the provision of a high length of elongation, the retention of the prestress of the connecting element is safeguarded during the expected dynamic operating loads on the vehicle wheel.

Ultimately, by this means the fatigue strength of the connection under dynamic alternating loads, for example in the case of the high alternating load cycles arising on the vehicle wheel, is improved. Hence the reliability of the connection between the wheel rim and the wheel disc is ensured in the long term.

In accordance with an advantageous embodiment, the wheel disc has a blind hole that corresponds to the through-hole of the rim base. The blind hole has a receiving channel connecting to the through-hole, through which the connecting element is guided, and a subsequent joining channel, in which the connecting element is joined.

Here, a shaft section of the connecting element is arranged loosely extended both in the through-hole of the rim base and in a receiving channel of the blind hole of the wheel disc, whilst the shaft end, as a terminal force-transmitting shaft section with a particular effective length is joined in the joining channel of the blind hole which connects to the receiving channel on the other side of the through-hole.

With this embodiment, the force-transmitting section at the shaft end of the connecting element is, to the benefit of an elongated shaft section guided through the through-hole of the rim base and the receiving channel, joined to the wheel disc in a recessed joining channel.

This design makes available the installation space in the wheel disc for the connection by means of a connecting element with a particularly long shaft section excluded from the direct force transmission, in order to achieve a high length of elongation.

When using a screw or a bolt as a connecting element it is provided that, in the installed state, a smooth shaft section is arranged in the through-hole of the rim base and the receiving channel and the threaded shaft end of the screw engages with a thread of the recessed joining channel.

Preferably, the length of the receiving channel provided for a corresponding connecting element corresponds to at least the length of the joining channel, preferably a multiple of the length of the joining channel. Accordingly, the appropriate installation space is made available for the use of connecting elements whose free length of elongation corresponds to at least the effective length of its directly force-transmitting section, in particular a multiple of the effective length.

Through the cyclical load placed long term on the vehicle wheel, the connection between wheel rim and wheel disc is particularly at risk from settling and creep phenomena and an associated autonomous loosening of the connection.

In trials on vehicle wheels it has been shown that connecting elements with a free length of elongation amounting to a multiple of the effective length formed are particularly suitable for avoiding the danger of the connection loosening autonomously.

Here the effective length of the connecting element required for optimal force transmission and thereby the joining channel of the wheel disc is, in turn, dependent on the material pairing. In order, for example, to introduce the maximum possible screw force of a steel screw into a wheel spider made from cast aluminium, the effective thread length (effective length) of the steel screw must correspond to at least 2.5 times the screw diameter.

In accordance with a preferred design, the length of elongation of the connecting element (3) is a multiple of the diameter of the connecting element (3), preferably 6 times the diameter of the connecting element (3).

It has been shown in further trials that connecting elements with properties so designed contribute advantageously towards removing the risk of autonomous loosening of the connection.

In particular cases of application it is advantageous if the connecting element is part of a connection arrangement having at least one bushing part in which the connecting element is mounted.

If the connection of the wheel disc to the wheel rim has such a connection arrangement with a one- or multi-part bushing in which the connecting element is guided, the connection according to the invention can advantageously be used for lightweight-construction wheel rims with a rim base made from weight-saving fibre composite, in particular from carbon fibre-reinforced plastic.

A bushing system separates the connecting element and—specific to the design—also the wheel disc from the rim base made from fibre composite. By this means the relative movements between the rim base and the connecting element or the wheel disc are decoupled, as a result of which vibratory-rubbing wear on the fibre composite and, as the case may be, also contact corrosion between the wheel rim made from fibre composite and a wheel disc made from other material can be avoided. In addition, better compatibility of the differing thermal expansions of these components is achieved.

By designing the connecting element as part of a connection arrangement, the advantages named at the start concerning the particularly longitudinally extended connecting element are likewise obtained.

As a result, the reliability of the connection is increased, even when using wheel rims made from fibre composite.

In accordance with a further advantageous embodiment, the connecting element or the connection arrangement is arranged countersunk in a recess of the through-hole on the outer side of the rim in such a way that the head of the connecting element and/or an edge, on the outer side of the rim, of a bushing part that may be provided, is flush with the contour of the tire seat on the outer side of the rim or forms a recess in relation to the contour of the tire seat on the outer side of the rim.

In both embodiments the head or the edge of the bushing part on the outer side of the rim at no point forms a contour that projects beyond the outer circumferential, cylindrical contour of the tire seat.

This prevents the connecting element integrated into the rim base in the area of the tire seat or the connection arrangement integrated there from interfering with the tire placed on the tire seat, so that the installation space for fitting the tire without damage is safeguarded and also subsequent damage to and premature wear of the tire material during operation of the vehicle wheel are avoided.

Preferably the connecting element or the connection arrangement is covered with a sealant on the outer side of the rim. Thereby the head of the connecting element, including an edge, on the outer side of the rim, of a bushing part that may be provided, is sealed above the through-hole vis-à-vis the tire chamber. The sealant may be an elastic sealing compound, a preformed sealing element or a coating layer.

By this means, a reliable seal of the tire chamber of the tire vis-à-vis the through-hole through the rim base is produced.

Preferably the sealant is a coating layer which for example is also used for sealing the surface, on the outer side of the rim, of a rim base made from fibre composite. By this means the seal of the tire chamber vis-à-vis the through-hole is generated with little effort and expense in one operation together with the sealing of the rim base. In addition, the sealing by means of a coating layer can be performed very reliably and without any appreciable influencing of the contour.

In a particularly advantageous design, the sealant is designed as the filling for a cavity of the recess on the outer side of the rim, which is produced above the recessed connecting element or above the recessed connection arrangement in the interior of the recess of the through-hole.

The sealant is so designed that it fills the remaining hollow space in the recess and simultaneously reproduces the outer, circumferential contour of the tire seat, by which means the continuous cylindrical contour pattern of the tire seat, which is interrupted in places by the connecting elements or by the connection arrangements is once again completed.

Through the restored uninterrupted contour of the tire seat, any discontinuities in the tire seat and partial cavities along the contour of the tire seat are avoided, so that the tire contacts with the tire seat consistently and homogenously all the way round, and thereby a tightness of the tire edge vis-à-vis the wheel rim all the way around and a secure, unimpeded flow of force between tire and wheel rim can be guaranteed.

Alternatively the connecting element or the connection arrangement is designed adapted to the contour of the tire seat on the outer side of the rim, as a result of which the advantages described above of the tight and reliable fit of the tire in the tire seat are likewise achieved.

In particular, here the head of a countersunk connecting element or an edge, on the outer side of the rim, of a bushing part that may be provided is designed so that its contour faithfully matches the contour of the tire seat on the outer side of the rim.

With connections designed in this way the surface, on the outer side of the rim, of the connecting elements or connection arrangements is optimally adapted to the relatively narrow contour of the tire seat and its bulging edge zone, so that it can have a larger cross section without negatively influencing the contour. Thereby—with reference to a connection site—the transmission of greater forces is enabled, which permits a reduction in the number of connecting elements or connection arrangements required, as a result of which the installation effort and expense is reduced and not least more variable design possibilities result for the wheel disc to be connected.

The connecting elements or connection arrangements designed adapted to the contour of the tire seat on the outer side of the rim are suitable for being covered with a coating layer that seals the rim base in its entirely, which by this means with little effort and expense and without influencing the contour, can also be performed to seal the tire chamber vis-à-vis the through-hole.

Through the design, according to the invention, of the connection of the wheel rim to the wheel disc the shaping of the rim base is only marginally influenced by the size and design of the connecting element or the connection arrangement. As a result of this, the designing of the rim base can be almost independent of the connecting element or the connection arrangements used, as a result of which more diverse design possibilities with regard to the design of the rim base are produced. The design of the rim base does not have to follow the requirements of the connection as much and can therefore be matched more to stress requirements, as a result of which a lower weight of the vehicle wheel can be achieved.

In terms of the method, in order to solve the task it is provided that the connection is produced in the area of the tire seat of the rim base and after the insertion of the connecting element into the wheel disc a portion of the connecting element projecting beyond the contour of the tire seat is finished in a shaping manner, so that the contour of the connecting element is adapted so as to faithfully match the contour of the tire seat on the outer side of the rim.

With this method a part of the connecting element, for example a part of the head of the connecting element, is removed after production of the connection through subsequent finishing, without influencing the effect of the connection.

Through the adaptation to the contour of the tire seat occurring during the finishing of the projecting portion, a largely continuous pattern of the tire seat, from the rim shoulder via each of the connecting elements up to the rim flange and circumferentially around the cylindrical circumferential surface of the tire seat, is generated in which the connecting elements arranged distributed across the circumference are essentially integrated in a way that matches the contour.

With this approach the connecting element is capable of being integrated into the narrow area of the tire seat largely regardless of its size.

The finishing, in a shaping manner, of the already-installed connecting element to adapt it to the surrounding contour conditions simplifies the process steps of the finishing of a connection site tailored to the contour of the tire seat.

Furthermore, in this approach the adaptation of the connecting element to the contour is more reliable and more precise than e.g. through a pre-fabricated contour. Since the contour of the tire seat, on the outer side of the rim, to be reproduced is changeable along the angle of rotation of the connecting element, a contour pre-fabricated on the connecting element would fit with the surrounding contour of the tire seat in only a few angle-of-rotation positions, which is less practical to execute.

As a result of the method according to the invention, a connection site precisely adapted to the contour of the tire seat on the outer side of the rim is produced which ensures that the tire sits on the wheel rim securely and tightly in the long term.

With the method design in which the connecting element is provided as part of a connection arrangement and the subsequent finishing, in a shaping manner, of a portion of the combined connection arrangement projecting beyond the contour of the tire seat on the outer side of the rim occurs in such a way as to adapt it to the contour of the tire seat on the outer side of the rim, the advantages named above concerning the subsequent finishing, in a shaping manner, of the connecting element are likewise obtained.

Furthermore, with this method design several parts, for example a head of the connecting element with another part of the portion of the connection arrangement projecting on the outer side of the rim, for example an edge of a bushing part on the outer side of the rim in which the connecting element is mounted, are finished collectively in a single operation in order to reproduce comprehensively the contour of the tire seat on the outer side of the rim.

A practical approach provides that the connecting element or the connection arrangement is adapted through machining, preferably through turning, sanding or milling, to the contour of the tire seat on the outer side of the rim.

Machining is particularly suitable when used on the rotationally symmetrical wheel rim. In this way, the projecting portions of the connecting elements or the projecting portions of the connection arrangements can be finished all the way round with little effort and expense and adapted with particularly high accuracy to the contour of the tire seat on the outer side of the rim, so that as a result a vehicle wheel with a very tight and secure tire seat can be guaranteed.

In a preferred method design a portion of the head of the connecting element or a radially extended portion of the connection arrangement is inserted into a recess of the through-hole that corresponds in a form-fit manner.

The radially extended portion of the connection arrangement can for example, alongside the countersunk head or flat head of the connecting element, comprise an edge of a bushing part extended on the outer side of the rim.

After the insertion and the finishing, in a shaping manner, of the connecting element or of the connection arrangement, the embedded portion of the head of the connecting element or of the radially extended edge of the connection arrangement remains secured in both a form-fit and force-fit manner in the recess of the through-hole acting as a bearing.

This advantageous design ensures, despite the material-minimising finishing of the connecting element or of the connection arrangement, a high force-transmitting effect of the connection, in particular the high pre-stressing force of the connecting element under the dynamic alternating load of the vehicle wheel and can be achieved with little technological effort and expense.

Preferably the connecting element or the connection arrangement is designed with an auxiliary geometry for the joining of the connection which is arranged in such a way that it is removed during the finishing of the portion of the connecting element or the connection arrangement projecting beyond the contour on the outer side of the rim.

Such an auxiliary geometry may for example be a bar, a slot, a hexagonal socket or a differently formed Allen® recess in the head of the connecting element or a serration in the edge of a bushing part on the outer side of the rim.

After the insertion of the connecting element or the connection arrangement, this auxiliary geometry is located outside of the contour of the tire seat on the outer side of the rim, so that with the finishing, in a shaping manner, of the projecting portion of the connecting element or the connection arrangement, a surface of the connecting element or the connection arrangement is achieved that has a perfectly continuous contour without any remaining recesses.

This makes finishing or evening-out the contour of the connecting element or the connection arrangement in the area of the auxiliary geometry superfluous. The removal of the auxiliary geometry and the continuous, integral adaptation of the contour to the contour of the tire seat on the outer side of the rim is achieved in a single operation.

In particular, through the removal of the auxiliary geometry, reductions in cross section and notching effects on the connecting element or in the connection arrangement are avoided and the force transmittable with the connecting element or the connection arrangement thereby increased, which improves the reliability and durability of the connection whilst keeping the required mass the same.

These and further features apparent from the patent claims, the description of the embodiments and the drawings can each be used per se or in combination as advantageous embodiments of the invention.

BRIEF DESCRIPTION OF THE INVENTION

The vehicle wheel according to the invention and the method according to the invention for the production thereof are described in more detail in the following embodiments. The associated drawings show, in a schematic representation, the following FIG. 1 an extract of a cross-sectional view of a vehicle wheel according to the invention with a wheel rim and a wheel spider which are connected by means of a countersunk bolt, FIG. 1a an enlarged detailed view X from the cross-sectional view in accordance with FIG. 1, FIG. 2 an extract of a cross-sectional view of the vehicle wheel in accordance with FIG. 1 with a countersunk bolt covered using a sealant, FIG. 3 an extract of a cross-sectional view of a vehicle wheel according to the invention with a wheel rim and a wheel spider which are connected by means of a connection arrangement consisting of a countersunk bolt and a two-part bushing, FIG. 4 an extract of a cross-sectional view of a first process step, according to the invention, of the production of the connection of a vehicle wheel with a wheel rim and a wheel spider by means of a countersunk bolt, FIG. 5 an extract of a cross-sectional view of a second process step, according to the invention, of the production of the connection of the vehicle wheel in accordance with FIG. 4, FIG. 6 an extract of a cross-sectional view of a first process step, according to the invention, of the production of the connection of a vehicle wheel with a wheel rim and a wheel spider using a connection arrangement consisting of a countersunk bolt and a two-part bushing, FIG. 7 an extract of a cross-sectional view of a second process step, according to the invention, of the production of the connection of the vehicle wheel in accordance with FIG. 6.

DETAILED DESCRIPTION OF THE DRAWINGS

Figure 1A:
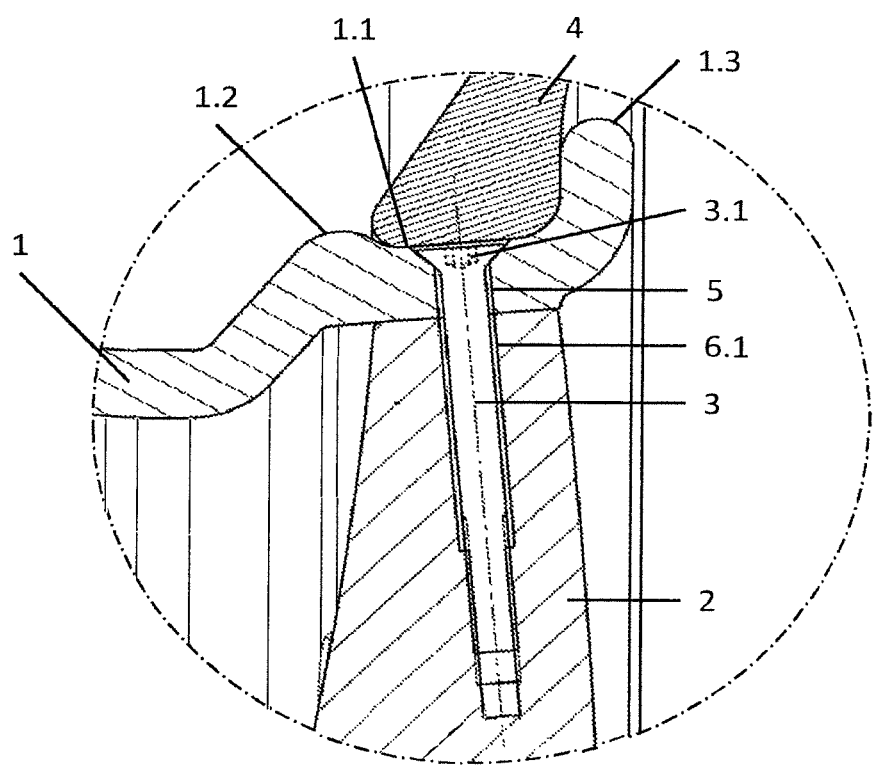

The first embodiment of the invention shows, in FIG. 1, a sectional view of a vehicle wheel according to the invention with a wheel rim 1 and a wheel spider 2 made from aluminium which are connected by means of several countersunk bolts 3 made from stainless steel arranged distributed around the circumference of the wheel rim 1. The sectional view shows the section through the vehicle wheel along the longitudinal axis of one of the connecting elements 3 guided through the rim base of the wheel rim 1 and joined in the wheel spider 2.

The attachment of the wheel spider 2 to the wheel rim 1 occurs in the area of a tire seat 1.1, which is formed in the rim base of the wheel rim 1 between the rim shoulder 1.2 (hump) and the rim flange 1.3 to accommodate a tire 4.

The radial outer contour of the essentially radially extended wheel spider 2 is adapted to the contour of the wheel rim 1 on the inner side of the rim beyond the tire seat 1.1, so that the wheel spider 2 is supported, in the installed state, against the wheel rim 1 in the area of the tire seat 1.1.

Accordingly the through-holes 5, provided for guiding the countersunk bolts 3, are constructed in the tire seat 1.1 of the rim base and essentially radially aligned. On the outer side of the rim each through-hole 5 has a recess, widened in a tapered manner (screwhole), for accommodating the countersunk head 3.1 of the bolt 3.

Each through-hole 5 through the tire seat 1.1 corresponds to one longitudinally extended blind hole 6 which extends, with an essentially radial alignment, deep into the longitudinally extended spoke end of the wheel spider 2. The blind hole 6 has, in an upper portion, a receiving channel 6.1 and, in a deeper, lower portion, a joining channel 6.2 with an internal thread. The countersunk bolt 3 is guided with its elongated smooth shaft portion through the through-hole 4 and through the receiving channel 6.1 of the blind hole 6 and engages, with the external thread of its shaft end, with the internal thread of the joining channel 6.2 of the blind hole 6. The interlocking thread length provides the effective length for the force transmission through the countersunk bolt 3. The elongated, thread-free shaft portion of the countersunk bolt 3 serves to provide a high length of elongation during the absorption of force by the bolt 3. In order, with the countersunk bolt 3, to be able to introduce the maximum possible force into the wheel spider 2 made from aluminium, the thread length of the shaft end engaging with the joining channel 6.2 of the blind hole 6 is at least 2.5 times the screw diameter. The thread-free, upper shaft section of the countersunk bolt 3 is, in this embodiment, approx. twice as large as the thread length of the shaft end.

The longitudinally extended space available in the spoke end of the wheel spider 2 makes it possible to use particularly long connecting elements 3 in the relevant advantageous ratios of effective length and length of elongation.

The countersunk bolt 3 has, for the purpose of screwing it into the wheel spider 2, a hexagonal socket in the countersunk head 3.1. As is more precisely visible from the enlarged detailed view X in FIG. 1a, the countersunk head 3.1 of the bolt 3 is, in the screwed state, arranged countersunk in the screwhole of the rim base in such a way that the flat countersunk head 3.1 at no point protrudes beyond the circumferentially curved rim outer side of the tire seat 1.1.

This is already ensured by the fact that the edge of the flat countersunk head 3.1 orientated perpendicular to the picture plane and in a tangential direction of the cylindrical circumferential surface of the rim base is flush with the adjacent circumferential surface of the tire seat 1.1. Geometrically the result of this is that the surface of the flat countersunk head 3.1 is lower paraxially than the contour of the tire seat 1.1 on the outer side of the rim, as is visible in FIG. 1a.

The countersunk head 3.1 can however, in the screwed state of the bolt 3, also be arranged countersunk in the screwhole of the rim base in such a way that the flat countersunk head 3.1 forms a complete recess in relation to the curved rim outer side of the tire seat 1.1.

In both cases, a projecting contour of the countersunk head 3.1 beyond the rim outer side of the tire seat 1.1 is prevented, so that no burrs or edges protrude into the installation space of the fitted tire and thus the tire 4 is not impeded or damaged in its placing in the tire seat.

Figure 2:
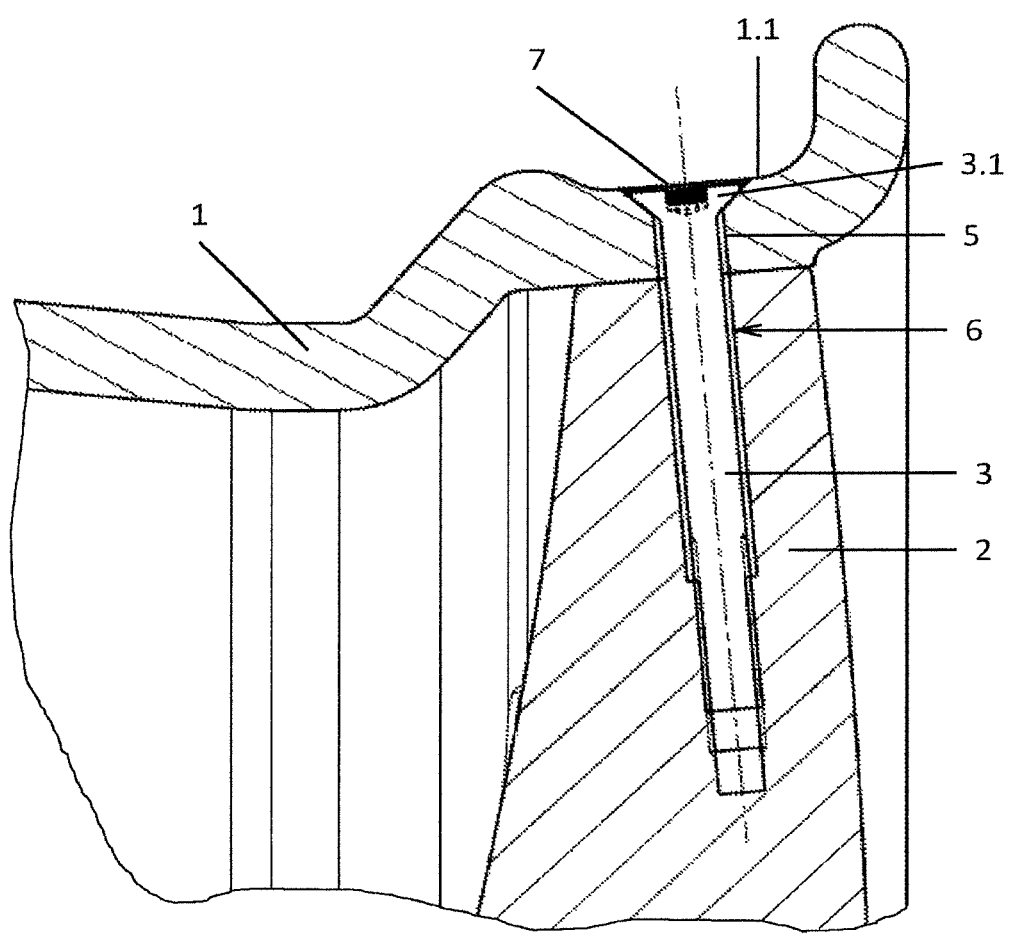

The design in accordance with FIG. 2 shows the vehicle wheel in accordance with FIG. 1 in which the countersunk head 3.1 of the countersunk bolt 3 arranged countersunk in the screwhole of the rim base is covered with an elastic sealing compound 7 as a sealant.

For the purposes of better illustration, the tire 4 is not shown here. The covering with the sealing compound 7 takes place in the embodiment in such a way that the remaining cavity of the screwhole above the countersunk head 3.1 is completely filled, whereby the outer surface of the filling is equipped, by means of the sealing compound 7, with a curved contour, which partially corresponds to the outer cylindrical contour of the tire seat 1.1 and thereby completes the contour of the tire seat on the outer side of the rim in a continuous manner.

Hence the existing connections in the tire seat 1.1 continue, even during the operation of the vehicle wheel, to have no disadvantageous influence—either on the sealing of the tire 4 vis-à-vis the wheel rim 1 or on the force transmission between tire 4 and wheel rim 1.

Figure 3:
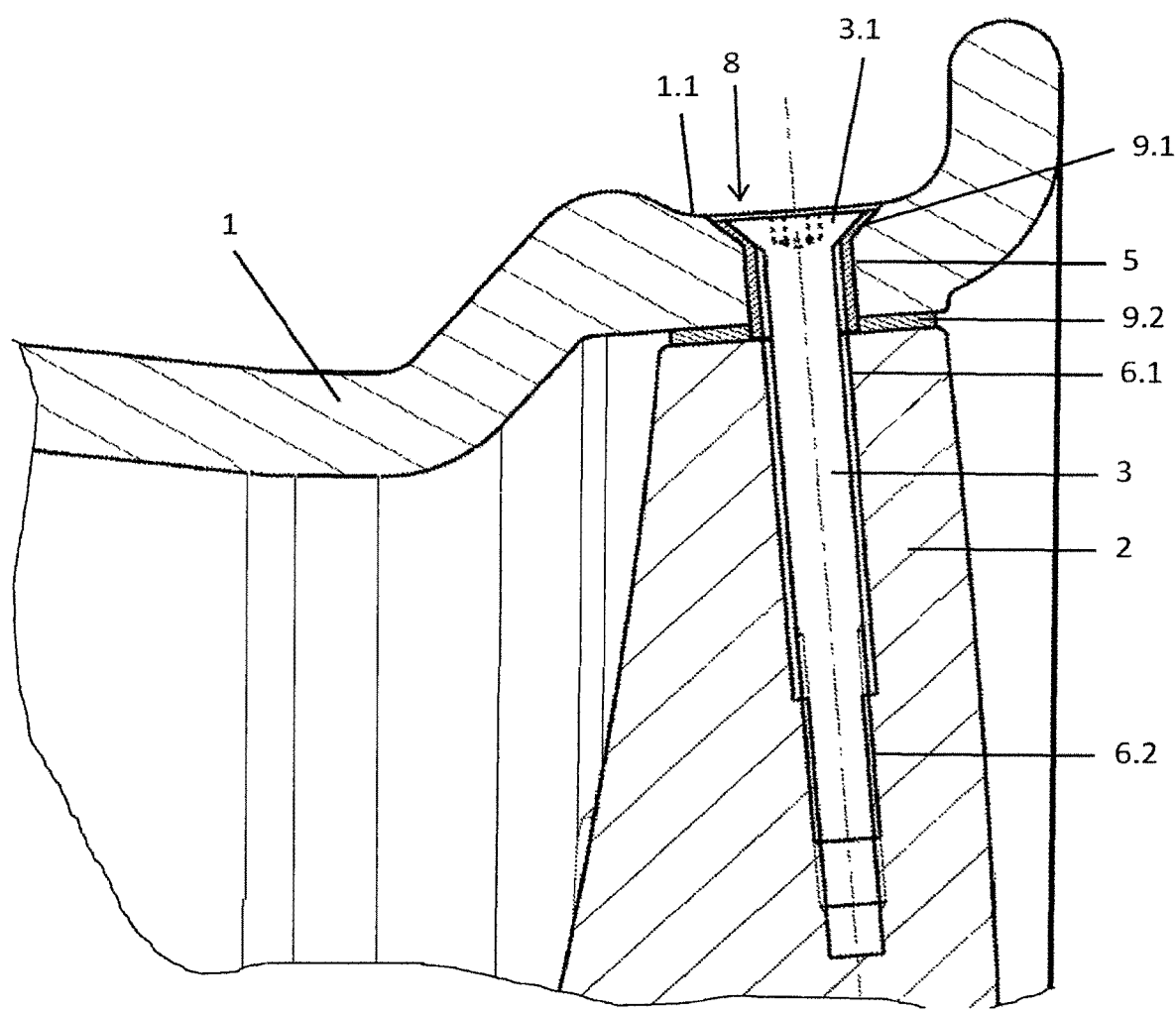

The embodiment of the invention in accordance with FIG. 3 relates to a vehicle wheel according to the invention similar to the vehicle wheel in accordance with FIG. 1, whereby a wheel rim 1, whose rim base consists of fibre composite, is connected to a wheel spider 2 made from aluminium.

In the following only the differences vis-à-vis the embodiment in accordance with FIG. 1 shall be described. The same functional components have the same reference symbols.

In order to attach the wheel spider 2 to the wheel rim 1 made from fibre composite, a combined connection arrangement 8 is provided which has a two-part bushing 9.1, 9.2 made from stainless steel in which the countersunk bolt 3 as a connecting element is guided.

The first bushing part 9.1 arranged in the through-hole 5 has, on the outer side of the rim, an edge area widened in a tapered manner which corresponds to the recess widened in a tapered manner (screwhole) of the through-hole 5 and furthermore is designed to correspond to the countersunk head 3.1. It protrudes on the inner side of the rim beyond the cross section of the rim base.

The second bushing part 9.2 comprises the first bushing part 9.1 protruding on the inner side of the rim and contacts with the rim inner side of the wheel rim 1.

The bushing parts 9.1, 9.2 hence create a favourable separation of the countersunk bolt 3 and of the wheel spider 2 from the rim base of the wheel rim 1, which protects the fibre composite of the rim base from, among other things, unwanted vibratory-rubbing wear.

The countersunk bolt 3 is guided through the first and second bushing parts 9.1, 9.2 into the radially extended blind hole 6 and engages, with the external thread of its shaft end, with the internal thread of the joining channel 6.2 of the blind hole 6.

In the screwed state the radial outer contour of the wheel spider 2 is pressed firmly onto the facing contact surfaces of the first and second bushing parts 9.1, 9.2, whilst the countersunk head 3.1 contacts with the edge area, widened in a tapered manner, of the first bushing part 9.1.

In the same manner as the design in accordance with FIG. 1, in the screwed state the edge area of the first bushing part 9.1 of the connection arrangement 8 is also arranged countersunk in the screwhole of the rim base in the same way as the countersunk head 3.1 of the bolt 3, so that this edge area, at least in a tangential direction of the cylindrical circumferential surface of the rim base, is flush with the rim outer side of the tire seat 1.1.

The result of this, purely geometrically, is that both the flat surface of the countersunk head 3.1 of the bolt 3 and the flat edge area of the first bushing part 9.1 lie, in the sectional plane shown, lower than the cylindrical contour of the tire seat 1.1 on the outer side of the rim, as visible in FIG. 3.

Alternatively, in the screwed state, the countersunk head 3.1 of the bolt 3 and the edge area of the first bushing part 9.1 can also be arranged countersunk in the screwhole of the rim base in such a way that, in addition to the countersunk head 3.1 the entire circumferential edge area of the first bushing part 9.1 also completely forms a recess in relation to the rim outer side of the tire seating 1.1.

By this means, in each case a projecting contour of the countersunk head 3.1 and of the edge area of the first bushing part 9.1 beyond the rim outer side of the tire seat 1.1 is prevented, so that no burrs or edges protrude into the installation space of the tire 4 (not shown here) and thus the tire 4 is not impeded or damaged in its placing in the tire seat 1.1.

With this design it is possible, in the same manner as the design in accordance with FIG. 2, for the connection arrangement 8 arranged countersunk in the screwhole of the rim base to be covered with a sealant 7, and namely preferably in such a way that the screwhole, above the countersunk head 3.1 of the bolt 3 and the edge area of the first bushing part 9.1 on the outer side of the rim, is completely filled with the sealant 7 and the outer surface of the sealant 7 partially completes the outer cylindrical contour of the tire seat 1.1 (not shown).

Figure 4:
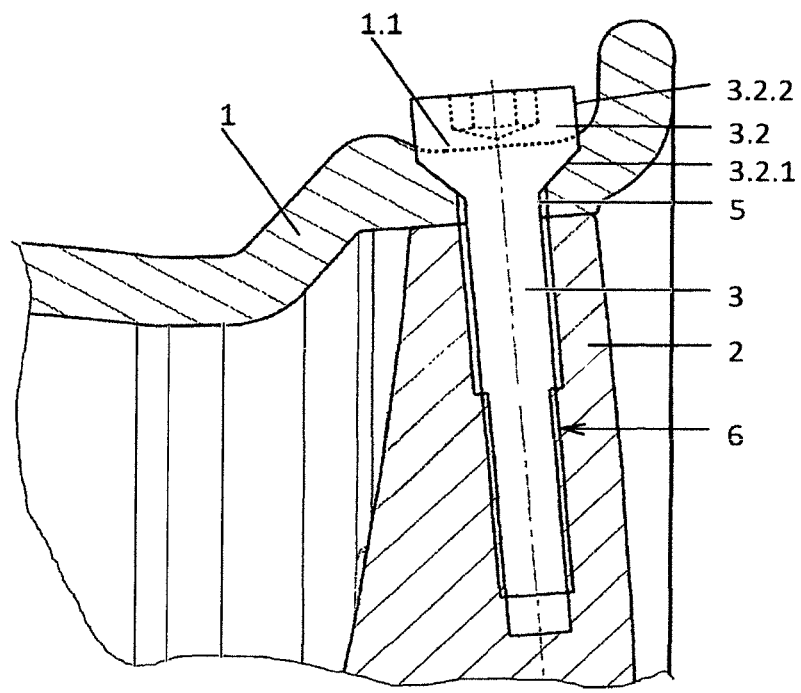
Figure 5:
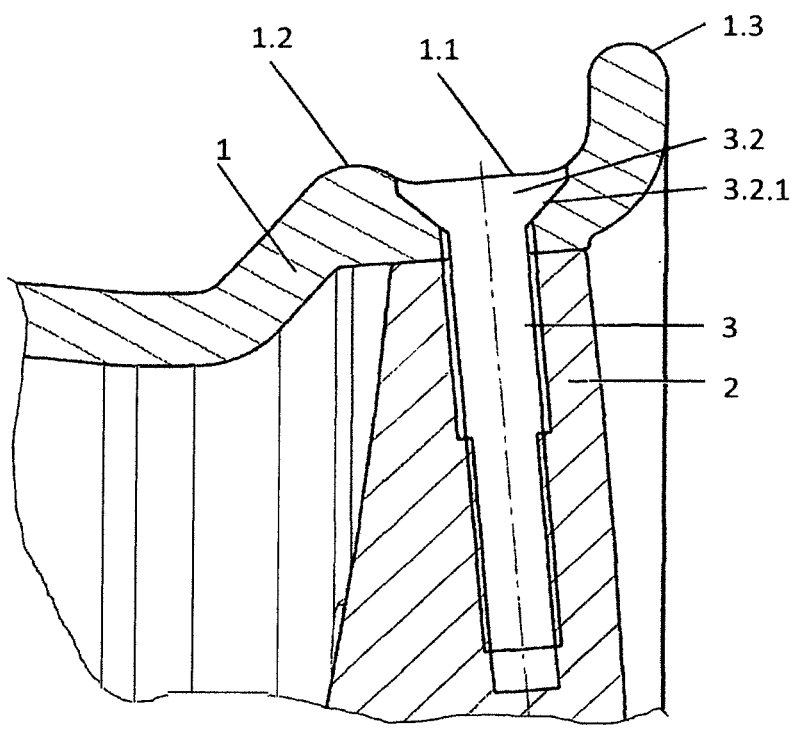

FIGS. 4 and 5 describe a method according to the invention for the production of a vehicle wheel, similar to the vehicle wheel in accordance with FIG. 1, with a connection of a wheel rim 1 and a wheel spider 2 made from aluminium in the area of the tire seat 1.1 of the wheel rim 1.

The same functional components are given identical reference symbols.

FIG. 4 shows, in a snapshot, a first process step according to the invention of the production of this connection.

By way of connecting elements, bolts 3 made from stainless steel with a large-sized, combined flat-countersunk head 3.2 are used which each have, in addition to a lower, tapered countersunk head portion 3.2.1, an upper, cylindrically shaped flat-head portion 3.2.2, whereby in the latter portion 3.2.2 a hexagonal socket is formed as an installation aid. The cross-sectional views in FIGS. 4 and 5 show one of the bolts 3 representatively for the total number of bolts 3 joined in the area of the tire seat 1.1 around the circumference of the wheel rim 1.

In the process step in accordance with FIG. 4, the bolt 3 is already pushed through the through-hole 5 constructed in the tire seat 1.1 and screwed into a corresponding, essentially radially aligned, longitudinally extended blind hole 6 of the wheel spider 2, whereby the bolt 3 is tightened using a tool (not shown) which engages with the hexagonal socket of the combined flat-countersunk head 3.2.

When all bolts 3 are screwed in, the radial outer contour of the wheel spider 2 is firmly attached to the contour of the wheel rim 1 on the inner side of the rim.

The through-hole 5 through the rim base has, on the outer side of the rim, a recess widened in a tapered manner (screwhole) that corresponds to the shape of the lower countersunk head portion 3.2.1 in which the flat-countersunk head 3.2 of the bolt 3 is embedded while screwing until the tapered countersunk head portion 3.2.1 contacts flat with the recess widened in a tapered manner. A large part of the flat-head portion 3.2.2 remains, in the screwed state of the bolt 3, above the contour of the tire seat 1.1 on the outer side of the rim and forms a projecting portion of the combined flat-countersunk head 3.2.

FIG. 5 shows, in a snapshot, a second process step of the production of the connection of the vehicle wheel in accordance with FIG. 4. In this subsequent process step the projecting portion of the combined flat-countersunk head 3.2 was removed through machining with for example a milling tool. The projecting portion is finished in such a way that the remaining portion of the flat-countersunk head 3.2 embedded in the recess of the through-hole 5, which essentially consists of the countersunk head portion 3.2.1, is adapted to the contour of the tire seat 1.1 on the outer side of the rim so as to faithfully match the contour.

With the finishing of the flat-countersunk head 3.2, the hexagonal socket of the flat-countersunk head 3.2 is, simultaneously and without further assistance, also removed, since its recessing geometry is suitably placed in the flat-head portion 3.2.2 projecting beyond the contour of the tire seat on the outer side of the rim.

Through this finishing of the flat-countersunk head 3.2, a completely continuous pattern of the tire seat 1.1 from the rim shoulder 1.2 to the rim flange 1.3 and circumferentially around the cylindrical circumferential surface of the wheel rim 1 is generated into which the finished flat-countersunk bolt 3 is integrated without any contour discontinuities. Thereby a fit of the tire 4 (not shown here) on the wheel rim 1 that is optimally contacting, tight vis-à-vis the tire chamber and undisturbed by the connections arranged in the tire seat 1.1, is achieved.

In a third process step (not shown) the finished surface of the flat-countersunk head 3.2 and the contour of the tire seat 1.1 on the outer side of the rim can be covered all over with a thin coating layer to seal the rim base and the through-holes 5.

Figure 6:
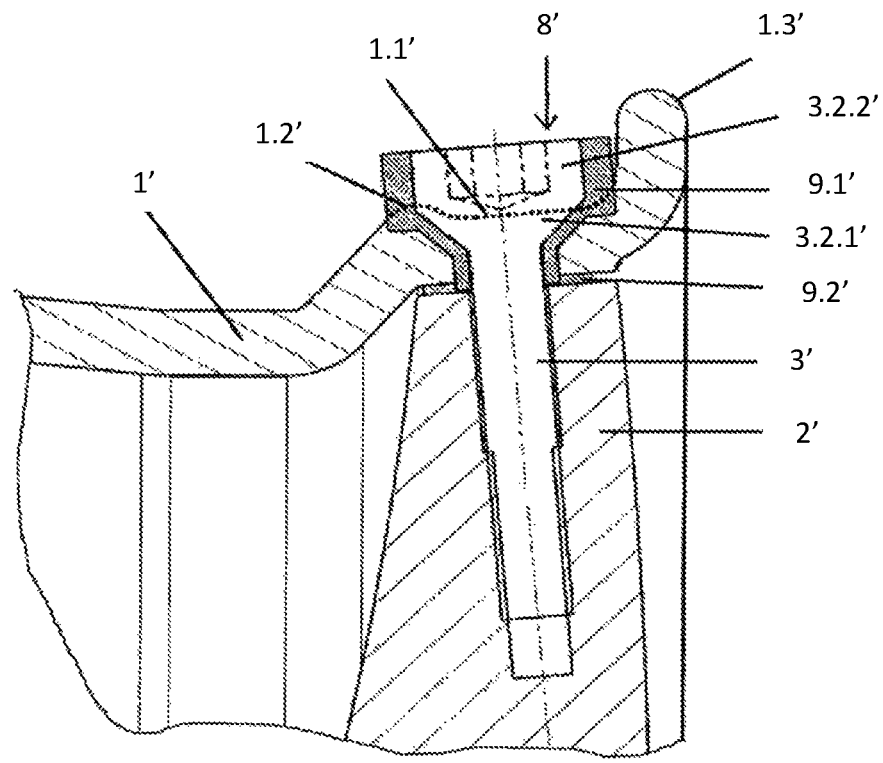
Figure 7:
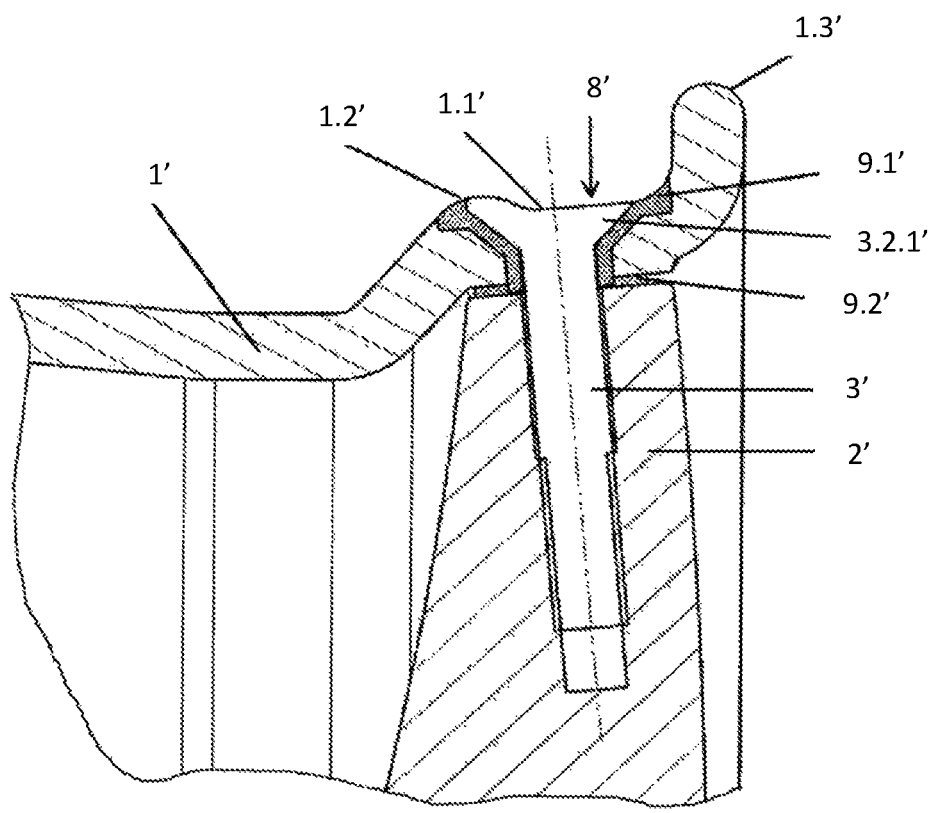

FIGS. 6 and 7 describe a second method according to the invention for the production of a vehicle wheel, similar to the vehicle wheel in accordance with FIG. 3, with a connection of a wheel rim 1' made from fibre composite and a wheel spider 2' made from aluminium in the area of the tire seat 1.1' of the wheel rim 1'.

The same functional components are given similar reference symbols.

FIG. 6 shows a snapshot of a first process step according to the invention for the production of this connection.

The wheel rim 1' and the wheel spider 2' are, unlike in the method in accordance with FIGS. 4 and 5, connected by means of several connection arrangements 8' arranged in the tire seat 1.1' and around the circumference of the wheel rim 1', each of which consist of a flat-countersunk bolt 3' as per the design in accordance with FIG. 4 and a two-part bushing 9.1', 9.2' made from stainless steel. The large-sized first bushing part 9.1' arranged in the through-hole of the tire seat 1.1' has, on the outer side of the rim, in addition to an area widened in a tapered manner, a cylindrically widened edge area which, in the installed state, completely accommodate the tapered countersunk head portion 3.2.1' or the cylindrically shaped flat-head portion 3.2.2' of the flat-countersunk head 3.2'.

In order to embed the first bushing part 9.1', widened in a 'stepped' manner, in the through-hole this has, on the outer side of the rim, a recess that is tapered in a stepped manner and cylindrically widened to correspond to the outer shape of the first bushing part 9.1', which (recess), owing to the circumference of the bushing part, reaches up to the rim shoulder 1.2' and the foot of the rim flange 1.3'.

Owing to the considerably large external cross section of the cylindrical portion of the bushing part 9.1', a large contact surface of the bushing part is provided, whereby the contact pressure acting on the fibre composite of the rim base is favourably reduced as a result of the longitudinal screw force of the bolt 3'.

A second bushing part 9.2' surrounds the first bushing part 9.1' on the inner side of the rim. The bushing parts 9.1', 9.2' completely line the through-hole to protect the rim base made from fibre composite.

In the process step in accordance with FIG. 6, the bolt 3' is already pushed through the first and second bushing parts 9.1', 9.2' in the through-hole and screwed into the corresponding, longitudinally extended blind hole 6' of the wheel spider 2', whereby the bolt 3' is tightened by means of a tool (not shown) which engages with the hexagonal socket of the combined flat-countersunk head 3.2'.

When all bolts 3' are screwed, the radial outer contour of the wheel spider 2' is pressed firmly onto the facing contact surfaces of the bushing parts 9.1', 9.2' and in each case the flat-countersunk head 3.2' embedded into the edge area of the first bushing part 9.1' that is widened in a tapered manner and cylindrically widened.

Essentially the flat-head portion 3.2.2' of the bolt 3' and a large part of the cylindrically widened edge area of the first bushing part 9.1' remain, in the screwed state of the bolt, above the contour of the tire seat 1.1' on the outer side of the rim and form a projecting portion of the connection arrangement 8'.

FIG. 7 shows in a snapshot the second, subsequent process step of the production of the connection of the vehicle wheel in accordance with FIG. 6, in which the projecting portion of the connection arrangement 8', or the flat-head portion 3.2.2' with the cylindrically widened edge area of the first bushing part 9.1', was removed with a machining tool and finished in a shaping manner in such a way that the remaining portion of the connection arrangement 8' embedded in the recess of the through-hole, essentially consisting of the countersunk head portion 3.2.1' and the edge area, widened in a tapered manner, of the first bushing part 9.1', is adapted to the contour of the tire seat 1.1' on the outer side of the rim so as to faithfully match the contour. Only a small remnant of the cylindrically widened edge area of the first bushing part 9.1' remains when machining occurs and on the one hand offers a generous contact surface for compensation of the surface pressure and on the other hand faithfully matches the contour and thereby, largely irrespective of the space available, is adapted to the contour of the tire seat 1.1' on the outer side of the rim and to the adjacent contour, on the outer side of the rim, of the rim shoulder 1.2' and the rim flange 1.3'.

Since the hexagonal socket of the flat-countersunk head 3.2' is arranged in the projecting portion outside of the contour of the tire seat 1.1', this is also removed during the finishing of the flat-countersunk head 3.2'.

As a result a completely continuous pattern of the tire seat 1.1', from the rim shoulder 1.2' to the rim flange 1.3' and circumferentially around the cylindrical circumferential surface of the tire seat, is created in which the adjacent connection arrangement 8' on the outer side of the rim made from flat-countersunk bolt 3' and two-part bushing 9.1', 9.2' is integrated without any contour discontinuities.

Thereby a fit of the tire (not shown here) on the wheel rim 1' that is optimally contacting and tight vis-à-vis the tire chamber, undisturbed by the multi-part connection arrangements arranged in the tire seat 1.1', is achieved.

In a third process step (not shown) it is possible, for the purpose of sealing the rim base and the through-holes, for the finished surface of the connection arrangement 8', or the surface of the remaining flat-head portion 3.2.2' of the flat-countersunk head 3.2' and of the cylindrically widened edge area of the first bushing part 9.1', and also the contour of the tire seat 1.1' on the outer side of the rim, to be covered all over with a thin coating layer.

The invention claimed is:

1. A method for the production of a vehicle wheel, the wheel including a wheel rim and a wheel disc configured to be connected to an inner side of the wheel rim, comprising:
    guiding a connecting element through a through-hole formed in a tire seat area of the wheel rim into a corresponding opening formed in the wheel disc,
    connecting the wheel disc to the wheel rim with the connecting element, and
    finishing, after said connecting, a portion of the connecting element that projects beyond a contour of the tire seat on an outer side of the rim such that a contour of the connecting element is adapted to match the contour of the tire seat on the outer side of the rim.

2. The method of claim 1 comprising a connection arrangement that includes the connecting element.

3. The method of claim 2 wherein after the joining of the connection arrangement in the wheel rim or wheel disc, a portion of the connection arrangement projecting beyond the contour of the tire seat on the outer side of the rim is finished so that the connection arrangement matches the contour of the tire seat.

4. The method of claim 2 comprising machining the connecting element or the connection arrangement to match the contour of the tire seat on the outer side of the rim.

5. The method of claim 4 wherein the machining comprises at least one of turning, sanding or milling.

6. The method of claim 1 wherein a portion of a head of the connecting element or a radially extended portion of a connection arrangement which comprises the connecting element is embedded in a recess, which corresponds in a form-fit manner, of the through-hole.

* * * * *